United States Patent
Walsh et al.

(10) Patent No.: US 11,575,519 B1
(45) Date of Patent: Feb. 7, 2023

(54) SYSTEM AND METHOD FOR AUTHENTICATING MEDIA USING BARCODES AND HASH VALUES

(71) Applicant: Bank of America Corporation, Charlotte, NC (US)

(72) Inventors: Jennifer Mae Walsh, Fort Mill, SC (US); Jennie Kathleen Egbert, Parker, CO (US); Mary Adelina Quigley, Indian Trail, NC (US)

(73) Assignee: Bank of America Corporation, Charlotte, NC (US)

( * ) Notice: Subject to any disclaimer, the term of this patent is extended or adjusted under 35 U.S.C. 154(b) by 296 days.

(21) Appl. No.: 16/879,867

(22) Filed: May 21, 2020

(51) Int. Cl.
*H04L 9/32* (2006.01)
*G06K 7/14* (2006.01)

(52) U.S. Cl.
CPC .......... *H04L 9/3239* (2013.01); *G06K 7/1417* (2013.01); *G06K 7/1447* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 5,842,191 A | 11/1998 | Stearns | |
| 6,647,128 B1 | 11/2003 | Rhoads | |
| 6,725,383 B2 | 4/2004 | Kyle | |
| 7,103,438 B2 | 9/2006 | Hallowell et al. | |
| 8,023,695 B2 | 9/2011 | Rhoads | |
| 8,272,562 B2 | 9/2012 | Ziegler | |
| 8,439,260 B2 | 5/2013 | Shi | |
| 8,534,543 B1 * | 9/2013 | Eker | G06K 19/10 235/375 |
| 8,813,154 B1 | 8/2014 | Sivertsen | |
| 8,914,767 B2 | 12/2014 | Savant et al. | |
| 8,944,322 B2 | 2/2015 | White | |
| 9,189,229 B2 | 11/2015 | Gadepalli | |
| 9,195,819 B2 | 11/2015 | Hudson et al. | |
| 9,286,557 B2 | 3/2016 | Deffeyes et al. | |
| 9,292,859 B1 | 3/2016 | Sivertsen | |
| 9,336,238 B2 | 5/2016 | Román | |
| 9,384,379 B1 | 7/2016 | Koster | |
| 9,396,376 B1 | 7/2016 | Naravanaswami | |
| 9,460,503 B2 | 10/2016 | Babbar | |
| 9,519,767 B2 | 12/2016 | Kim | |

(Continued)

*Primary Examiner* — Brandon Hoffman

(57) ABSTRACT

A system includes an authentication server and a media authentication device. The authentication server stores authenticated media files. The authenticated media files have an associated string value. Generally, the authentication device is used to scan a barcode on a media sample, determine a string value from the scanned barcode, generate a string value based on fragments of the media sample, and determine a string value from an authenticated media file on the authentication server. The authentication device then concatenates the barcode string value with the generated string value, and it concatenates the authentication string value with the generated string value. A hash function is applied to the concatenated string values, and the resulting hash values are compared. The authentication device causes to be displayed an indication that the media sample is authentic when the hash values match.

20 Claims, 3 Drawing Sheets

(56) References Cited

U.S. PATENT DOCUMENTS

| | | |
|---|---|---|
| 9,659,185 B2 | 5/2017 | Elovici et al. |
| 9,798,721 B2 | 10/2017 | Alhamed et al. |
| 10,121,027 B2 | 11/2018 | Catalano et al. |
| 10,262,236 B2 | 4/2019 | Lim et al. |
| 10,445,392 B2 | 10/2019 | Pan |
| 10,452,897 B1 | 10/2019 | Benkreira et al. |
| 10,552,846 B2 | 2/2020 | Caton et al. |
| 2006/0169769 A1 | 8/2006 | Boyarsky et al. |
| 2009/0328143 A1* | 12/2009 | Ming ............... H04N 1/32283 726/2 |
| 2013/0016214 A1 | 1/2013 | Dlott et al. |
| 2013/0146658 A1 | 6/2013 | Guerra |
| 2013/0230167 A1* | 9/2013 | Bauchot ............ H04L 9/3234 380/44 |
| 2014/0324589 A1 | 10/2014 | Pacey |
| 2014/0359294 A1 | 12/2014 | Armitage |
| 2015/0326565 A1 | 11/2015 | Kuang et al. |
| 2016/0210408 A1 | 7/2016 | Yu et al. |
| 2016/0253732 A1 | 9/2016 | Brown |
| 2016/0314462 A1 | 10/2016 | Hong et al. |
| 2017/0142460 A1 | 5/2017 | Yang et al. |
| 2017/0161718 A1 | 6/2017 | Zhang |
| 2017/0169496 A1 | 6/2017 | Zhang |
| 2018/0114017 A1 | 4/2018 | Leitner et al. |
| 2018/0157813 A1 | 6/2018 | Rodrigs et al. |
| 2018/0240144 A1* | 8/2018 | Curtis ............... G06Q 30/0237 |
| 2018/0268222 A1 | 9/2018 | Sohn et al. |
| 2018/0341878 A1 | 11/2018 | Azout et al. |
| 2018/0349702 A1 | 12/2018 | Gildert et al. |
| 2019/0122072 A1 | 4/2019 | Cricri et al. |
| 2019/0147333 A1 | 5/2019 | Kallur Palli Kumar et al. |
| 2019/0164173 A1 | 5/2019 | Liu et al. |
| 2019/0179861 A1 | 6/2019 | Goldenstein et al. |
| 2019/0197789 A1 | 6/2019 | Macauley et al. |
| 2019/0236614 A1 | 8/2019 | Burgin et al. |
| 2019/0278378 A1 | 9/2019 | Yan |
| 2019/0355128 A1 | 11/2019 | Grauman et al. |
| 2020/0012806 A1 | 1/2020 | Bates et al. |
| 2020/0065526 A1 | 2/2020 | Berman |
| 2020/0092301 A1 | 3/2020 | Coffing |
| 2021/0233204 A1* | 7/2021 | Alattar ................. G06T 1/005 |
| 2021/0258168 A1* | 8/2021 | Decoux ............... H04L 9/3239 |
| 2021/0287230 A1* | 9/2021 | Decoux ............... H04L 9/3239 |

\* cited by examiner

SYSTEM AND METHOD FOR AUTHENTICATING MEDIA USING BARCODES AND HASH VALUES

TECHNICAL FIELD

This disclosure relates generally to digital media authentication, and more specifically to a system and method for authenticating media using barcodes and hash values.

BACKGROUND

Synthetic media are a growing problem in the information security field. Synthetic media are artificially generated or manipulated media samples. Visual and audio content are generated using machine learning and artificial intelligence. Humans are not capable of detecting advanced synthetic media without the aid of computers. Unauthorized individuals use synthetic media, often videos, to deceive viewers/listeners. The resulting trust gap among users of digital media hinders further adoption of digital media technology.

SUMMARY OF THE DISCLOSURE

According to one embodiment, a system includes an authentication server and a media authentication device. The authentication server includes a memory that stores an authenticated media file. The authenticated media file is associated with a first string value. A plurality of fragments of the authenticated media file are used to generate the first string value. The media authentication device includes a hardware processor communicatively coupled to an optical scanner and a memory. The memory stores a hash function. The optical scanner is configured to scan a barcode from a media sample. The hardware processor determines a second string value by decoding the barcode. The hardware processor also generates a third string value based on fragments of the media sample. The hardware processor then concatenates the first string value with the second string value, and it concatenates the third string value with the second string value. The hardware processor applies a hash function to the concatenated string values. If the hardware processor then determines that the resulting hash values match, then it causes to be displayed an indication that the media sample is authentic.

According to another embodiment, a method includes determining a first string value from a scanned barcode associated with a media sample. The method also includes determining a second string value from a first memory. The second string value is generated based on a plurality of fragments from an authenticated media file. The method includes generating a third string value based on a plurality of fragments from the media sample. The method further includes concatenating the first string value with the second string value, and concatenating the first string value with the third string value. The method also includes applying a hash function to the concatenated string values. The method includes determining whether the resulting hash values match, and if so, the method further includes causing to be displayed an indication that the media sample is authentic.

According to yet another embodiment, an apparatus includes a memory, an optical scanner, and a hardware processor. The memory stores a hash function. The optical scanner is configured to scan a barcode from a media sample. The hardware processor determines a first string value from the scanned barcode. The hardware processor also determines a second string value from a second memory. The second string value is generated based on a plurality of fragments from an authenticated media file. The hardware processor generates a third string value based on a plurality of fragments from the media sample. The hardware processor then concatenates the first string value with the second string value, and it concatenates the first string value with the third string value. The hardware processor applies a hash function to the concatenated string values. If the hardware processor then determines that the resulting hash values match, it causes to be displayed an indication that the media sample is authentic.

The systems and methods disclosed in this application provide a technical solution to the problem discussed above by providing a unique barcode system that can be authenticated using hash functions. This technical advance is made possible with a unique code that is generated from portions of the media itself. The disclosed system and methods provide several practical applications and technical advantages which include a process for validating media files using a unique barcode system. The barcodes may be derived from a media sample, which significantly decreases the ability to replicate the barcode on a synthetic media file. This method also permits comparison of media files without making a full comparison of the two files. Significant savings of processor resources is realized because the direct comparison of media samples is unnecessary.

Furthermore, the described system and methods distinguish synthetic media from authentic media. By providing methods for validating digital media, the disclosed system enables the expansion of digital media to new uses where the threat of synthetic media previously hindered acceptance. For example, digital media outlets inundated with synthetic media uploaded by malicious actors may use the disclosed systems and methods to verify the authenticity of uploaded media samples. As another example of a practical application, the disclosed systems and methods may permit legal systems around the globe to continue using video and audio recordings as evidence in legal proceedings even though the existence of synthetic media calls into question the validity of once unassailable evidence.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
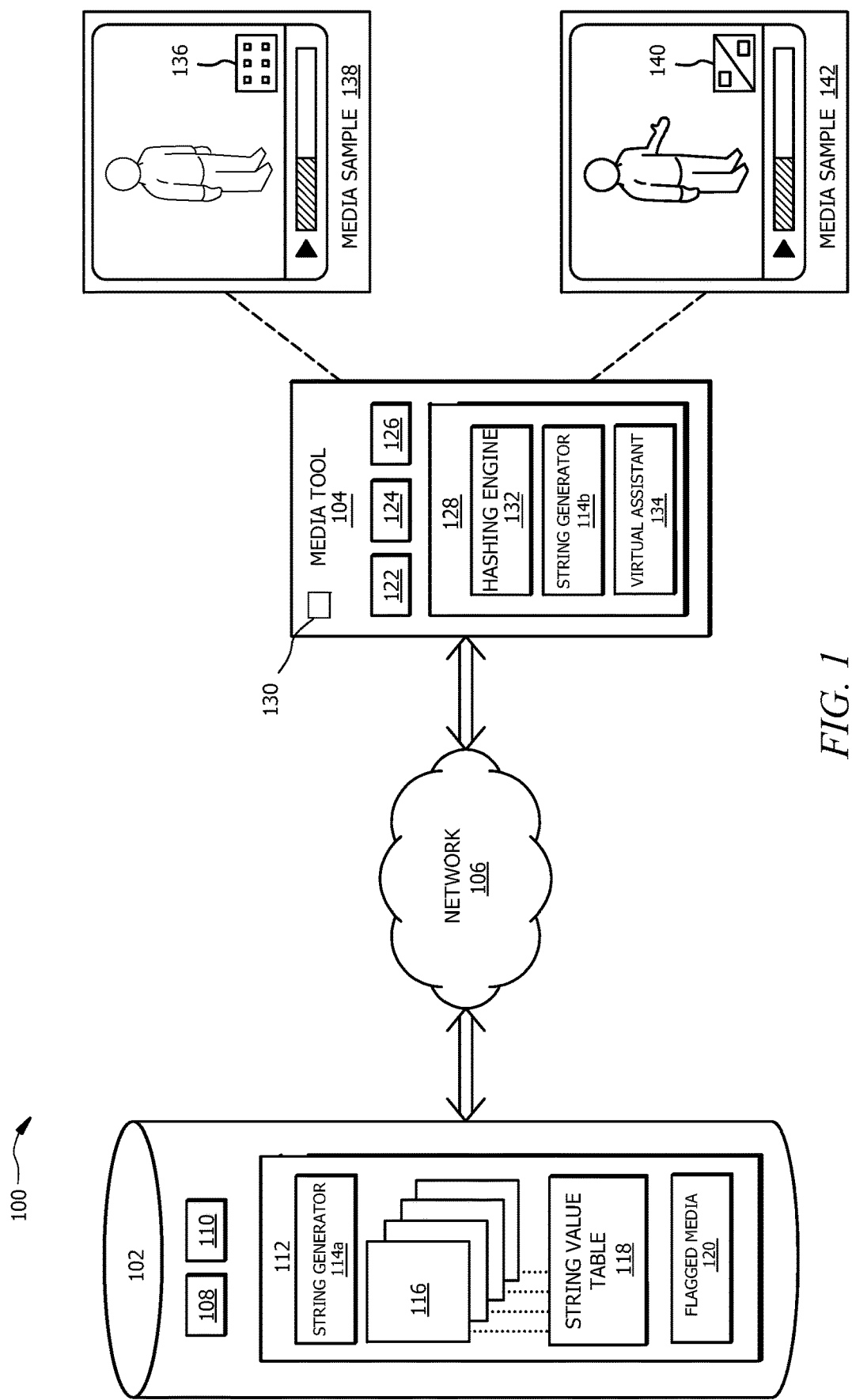
FIG. 1 is a schematic diagram of an example system for authenticating media using barcodes and hash values.
Figure 2:
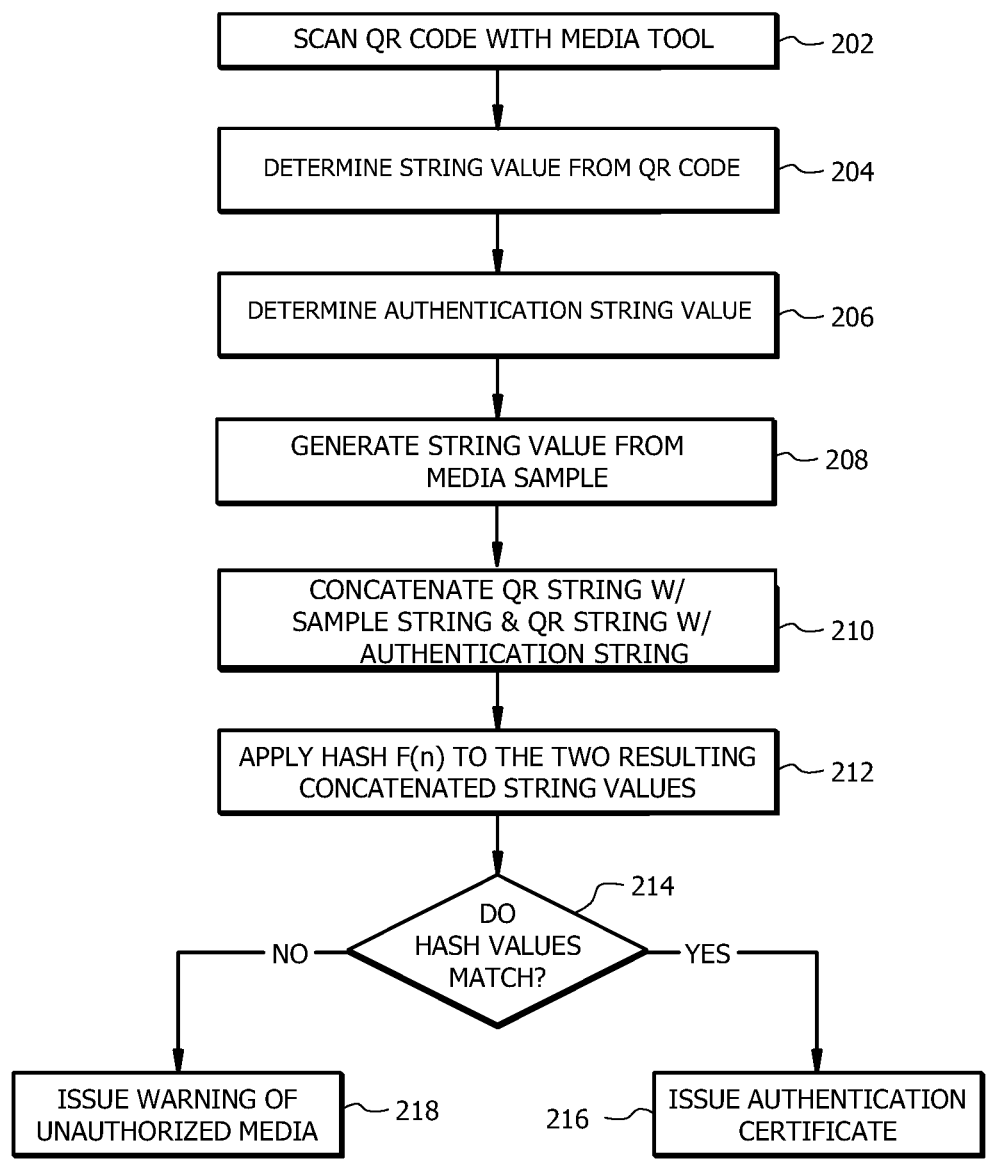
FIG. 2 is a flowchart of an example method for authenticating media using barcodes and hash values.
Figure 3:
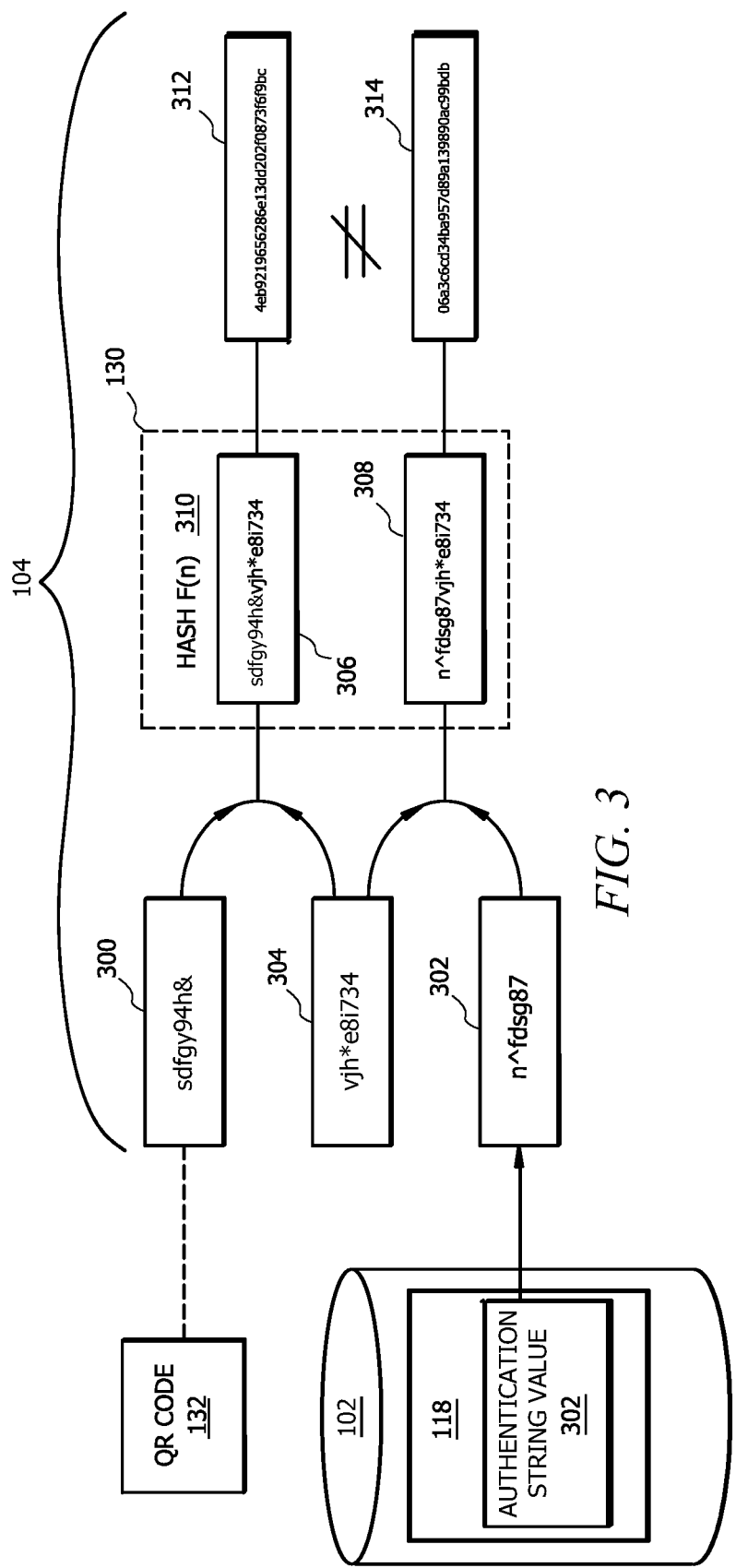
FIG. 3 illustrates how the media tool in the example system from FIG. 1 may perform the method of FIG. 2.

Embodiments of the present disclosure and its advantages are best understood by referring to FIGS. 1-3 of the drawings, like numerals being used for like and corresponding parts of the various drawings.

Media Authentication System Overview

FIG. 1 is a schematic diagram of an example system 100 for authenticating media using barcodes and hash values. The example media authentication system 100 is generally configured to read barcodes on media samples and compare the data in the barcode with data from an authentication server. In a practical application of the method performed by the media authentication system 100, the security of digital media files is increased by using unique barcodes derived from the media sample. A hash function is applied to data associated with the barcodes to facilitate comparison with authentic media samples. By comparing the hashed values from the barcode and the authenticated media sample, the media authentication system 100 can determine if there is any deviation from authentic media samples without necessitating full comparisons of the media samples. Significant savings of processor resources is realized because the direct comparison of media samples is unnecessary. The improved security enabled by this practical application enables digital media to play a larger societal role.

In one embodiment, the media authentication system 100 comprises an authentication server 102 and a media tool 104 that are in signal communication through network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

Authentication Sever

An example authentication server 102 includes a processor 108, a network interface 110, and a memory 112. The processor 108 comprises one or more processors operably coupled to the memory 112. The processor 108 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, the processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 108 are configured to implement various instructions. For example, the one or more processors 108 are configured to execute instructions to implement a string generator 114a. In this way, processor 108 may be a special purpose computer designed to implement the functions disclosed herein. In an embodiment, the string generator 114a is implemented using logic units, FPGAs, ASICs, DSPs, or any other suitable hardware. For example, the string generator 114a may be configured to perform one or more steps (e.g., step 208) of a method 200 as described in FIG. 2.

The network interface 110 is configured to enable wired and/or wireless communications. The network interface 110 is configured to communicate data between the authentication server 102 and other devices (e.g., media tool 104), systems, or domains. For example, the network interface 110 may comprise a WIFI interface, a LAN interface, a WAN interface, a modem, a switch, or a router. The processor 108 is configured to send and receive data using the network interface 110.

The network interface 110 may be configured to use any suitable type of communication protocol as would be appreciated by one of ordinary skill in the art.

Memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise read-only memory (ROM), random-access memory (RAM), ternary content-addressable memory (TCAM), dynamic random-access memory (DRAM), and static random-access memory (SRAM).

The memory 112 is operable to store string generator 114b, a plurality of authentic media samples 116, a table of string values 118, and a repository of flagged media 120. Each of the string values stored table 118 is associated with an authentic media sample 116. Operation of the string generator 114b is described in detail in FIG. 2. The role of the authentic media samples 116 and string values table 118 is described in more detail in FIGS. 2 and 3. The repository of flagged media 120 contains reports from media tool 104 that a media sample is synthetic. The repository of flagged media 120 may also include records of authenticated media samples. Users of media tool 104 may access the repository of flagged media 120 to learn of potential sources of synthetic media.

Media Tool

An example media tool 104 includes a processor 122, a network interface 124, an optical scanner 126, memory 128, and audio sensor 130. The processor 122 comprises one or more processors operably coupled to network interface 124, optical scanner 126, and memory 128. The processor 122 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 122 may be a programmable logic device, a microcontroller, a microprocessor, or any suitable combination of the preceding. The one or more processors 122 are configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 122 are configured to implement various instructions. For example, the one or more processors 122 are configured to execute instructions to execute a hashing engine 132 or a string generator 114b. In this way, processor 122 may be a special purpose computer designed to implement the methods disclosed herein. In an embodiment, the hashing engine 132 and string generator 114*b* are implemented using logic units, FPGAs, ASICs, DSPs, or any other suitable hardware. For example, the hashing engine 132 may be configured to perform one or more steps (e.g., step 212) of the method 200 described in FIG. 2, and the string generator 114*b* may be configured to perform one or more steps (e.g., step 208) of the method 200 as described in FIG. 2.

The network interface 124 is configured to enable wired and/or wireless communications. The network interface 124 is configured to communicate data between the media tool 104 and other devices (e.g., authentication server 102), systems, or domains. For example, the network interface 124 may comprise a WIFI interface, a LAN interface, a WAN interface, a modem, a switch, or a router. The processor 122 is configured to send and receive data using the network interface 124. The network interface 124 may be configured to use any suitable type of communication protocol as would be appreciated by one of ordinary skill in the art.

Optical scanner 126 is any input device using light to scan codes, text, or images and convert them into a computer-readable format. For example, the optical scanner 126 may be a camera, a barcode scanner, or any other scanning device. The optical scanner 126 may be configured to read a linear (1D) barcode or a 2D barcode. The optical scanner 126 may comprise a laser scanner, a LED scanner, a video camera scanner, or any other type of scanner known to those skilled in the art to be capable of scanning a barcode. The optical scanner 126 is configured to scan barcodes. For example, in FIG. 1 the optical scanner 126 is capable of scanning quick response code 136 on media sample 138 and quick response code 140 on media sample 142.

Memory 128 comprises one or more disks, tape drives, or solid-state drives, and may be used as an over-flow data storage device, to store programs when such programs are selected for execution, and to store instructions and data that are read during program execution. The memory 128 may be volatile or non-volatile and may comprise read-only memory (ROM), random-access memory (RAM), ternary content-addressable memory (TCAM), dynamic random-access memory (DRAM), and static random-access memory (SRAM). The memory 128 is operable to store a string generator 114*b*, a hashing engine 132, and a virtual assistant 134. The hashing engine 132 includes one or more hash functions. The string generator 114*b* and hashing engine 132 are described in detail in FIGS. 2 and 3. The virtual assistant 134 is a software agent capable of performing a variety of tasks based on commands or questions. Virtual assistant 134 may be a software application offered by the operator of authentication server 102. The commands may be human speech be detected by audio sensor 130. Commands may also be made using text input. In some embodiment, the virtual assistant 134 is activated when the optical scanner 126 scans a barcode, such as quick response code 136. Additional details about embodiments using virtual assistant 134 are provided in the discussion of FIG. 2.

Audio sensor 130 is any sensor that converts sound into an electrical signal. The audio sensor 130 may be, for example, an electret microphone or a MicroElectrical-Mechanical System (MEMS) microphone. In alternate embodiments, the audio sensor 130 may be a condenser microphone, a dynamic microphone, a ribbon microphone, a carbon microphone, a piezoelectric microphone, a fiber-optic microphone, or a laser microphone. Those skilled in the art will appreciate that various other microphone types may be used.

Media Authentication Process

FIG. 2 is a flowchart of an example method 200 for authenticating media using barcodes and hash values. The method 200 may be performed by the hardware processor 122. The method 200 starts at step 202 by using the optical scanner 126 of media tool 104 to scan a quick response (QR) code on a media sample. For example, a user of media tool 104 might scan the quick response code 136 on media sample 138. In alternate embodiments, the quick response code 136 may be another type of barcode. In some embodiments, scanning a barcode at step 202 activates the virtual assistant 134. The virtual assistant 134 may ask the user if it wants to verify a media sample. If the user tells the virtual assistant 134 that it suspects the media sample is not authentic, the virtual assistant 134 may initiate the following steps in method 200. It should be noted that while the virtual assistant 134 is illustrated as residing on the media tool 104, it is possible for the virtual assistant to be hosted on separate device. For example, the virtual assistant 134 may be on a laptop or tablet that is in communication with the media tool 104.

Returning to FIG. 2, the media tool 104 decodes the scanned quick response code 136 at step 204. Decoding allows the media tool 104 to determine a string value and a media identifier that is associated with media sample 138. Decoding may also provide a link to the host of the media sample 138. The string value may be a finite sequence of characters—letters, numbers, symbols, punctuation marks, or any combination thereof.

At step 206, the media tool 104 determines an authentication string value. Authentication string values are stored in string value table 118 of authentication server 102. The authentication string values may be generated by the authentication server 102. The string generator 114*a*, as implemented by processor 108, is configured to use fragments of an authentic media sample 116 to generate a string value. For example, the string generator 114*a* may randomly select portions of the encoded information comprising a single authentic media sample 116 to serve as the authentication string value. Alternatively, users may define rules for which portions of an authentic media sample 116 should be used to generate the authentication string value. In some embodiments, the user may predetermine that certain portions of an authentic media sample 116 are essential and instruct the string generator 114*a* that the authentication string value for that authentic media sample 116 is to be based on those essential portions. For example, if the authentic media sample 116 is a video of a speech, then the user of authentication server 102 might deem portions of the speech essential. The string generator 114*a* would then generate a unique string value from those essential portions of the video. Thus, if any of the essential portions of the video are altered, for example in a synthetic media sample, then a string value generated from the altered version would not match the string value generated from the authentic media sample 116. Some embodiments may use the size of the video file to generate the string value. Some embodiments may use all or a portion of the code of an audio file associated with an authentic media sample 116 to generate the authentication string value. For example, the authentication string value may be a compressed representation of the entire audio file associated with a media sample 116. In each of the described embodiments, the resulting string value is short enough to be encoded in a barcode, such as a quick response code.

The string value is determined using the media identifier determined at step 204. Each string value listed in the string value table 118 is linked to a media identifier stored in string value table 118 that is associated with an authentic media sample 116. In one embodiment, the media tool 104 accesses the string value table 118 and searches for a match to the media identifier. When the media tool 104 identifies a match, it retrieves the authentication string value associated with the matched media identifier. In alternative embodiments, the media tool 104 sends the media identifier to the authentication server 102. The authentication server 102 searches the string value table 118 for a match to the media identifier. When the authentication server 102 identifies a match, it retrieves the authentication string value associated with the matched media identifier, and it sends the authentication string value to the media tool 104.

At step 208, the media tool 104 generates a string value from the media sample. The string generator 114*b* on the media tool 104 generally operates the same as the string generator 114*a* on the authentication server 102. The difference is that the string generator 114*b* on the media tool 104 generates string values from unauthenticated media sources, such as media sample 138, while the string generator 114*a* on authentication server 102 generates string values from authenticated media samples 116. The string generators 114 may use the same string generation rules so that authentication server 102 and media tool 104 will generate the same string value for identical copies of a media sample. The instance of the string generator 114*b* on the media tool 104 can generate string values from the code of the media sample or from an audio-visual sampling using the optical scanner and the audio sensor. For the string generator 114*b* to use the code of the media sample 138, the media tool visits the host of the media sample 138. This is accomplished by determining a source location for the media sample 138 based on the decoding of the quick response code 136 performed at step 204. The media tool 104 may then read the code of the media sample 138 from the host and generate a sample string value from the code. Alternatively, the media tool 104 may use the optical scanner and/or the audio sensor to capture portions of the media sample 138. These captured portions of the media sample 138 are then translated into a string value.

It should be noted that steps 204, 206 and 208 may be performed in various sequences. Each of these steps occur after scanning the barcode (e.g., quick response code 136), but the ordering in the example of FIG. 2 is not limiting. Additional detail regarding steps 204-208 is provided with respect to FIG. 3.

Proceeding to step 210, the media tool 104 concatenates the quick response string value with the sample string value, and it also concatenates the authentication string value with the sample string value. Concatenation may occur in any order, but concatenation will occur in the same order for the two sets of string values. For example, consider a quick response string value X, a sample string value Y, and an authentication string value Z. If the media tool 104 concatenates the quick response string value and the sample string value to yield string value XY, then media tool 104 concatenates the authentication string value and the sample string value to yield string value ZY. Alternatively, the strings may be concatenated in reverse order to yield strings YX and YZ. If the media sample is authentic, then concatenation at step 210 will yield two identical strings. Additional detail regarding step 210 is provided with respect to FIG. 3.

The method 200 proceeds to step 212 where hashing engine 132 applies a hash function to the concatenated strings to generate two hash values. The hash function used by the hashing engine 132 produces a unique result for each input string value. Thus, if the concatenated strings generated at step 210 are the same, then the resulting hash values will be the same. Additional detail regarding step 212 is provided with respect to FIG. 3.

The media tool 104 then proceeds to step 214 where it compares the hash values generated at step 212. If the media tool 104 determines that the hash values generated at step 212 match, then the media tool 104 issues an authentication certificate at step 216. The authentication certificate may be in the form of a message displayed on media tool 104. The authentication message may be displayed on an external display. The authentication message may be an audio statement made by virtual assistant 134. The authentication message may also be distributed to a predetermined list of recipients. The authentication message may alternatively be published to public media outlets. If, however, the hash values do not match, then the media tool 104 issues a warning that the media sample 138 is unauthorized at step 218. The warning may be in the form of a message displayed on media tool 104. The warning may be displayed on an external display. The warning may be an audio statement made by virtual assistant 134. The warning may be distributed to a predetermined list of recipients. Alternatively, the warning may be published to public media outlets.

In embodiments where virtual assistant 134 was used at step 202, the virtual assistant 134 may also send a report to authentication server 102 that the media sample 138 is authentic at step 216 or that the media sample 138 is unauthorized at step 218. Authentication server 102 may store such reports in flagged media repository 120. Reports saved in flagged media repository 120 provide a media sample identifier as well as an identifier of the host where the media sample was viewed or heard. Other individuals with access to an instance of virtual assistant 134 may ask the virtual assistant 134 about whether a media source or a media sample hosted at a certain location are authentic. The virtual assistant 134 may then compare a media sample identifier associated with the sample in question or an identifier associated with the host of the sample in question to the reports saved in flagged media repository 120. Virtual assistant 134 may then provide a message to its user to indicate whether there are any matches in the flagged media repository. If the sample in question matches a report that the media is authentic, then the virtual assistant 134 may tell the user that the media sample is authentic. On the other hand, the virtual assistant 134 may tell the user that the sample in question is synthetic if its identifier matches an identifier in a report that the media sample is unauthorized. The match may alternatively be to a media host rather than an individual media sample. In such a case, the virtual assistant 134 may inform its user that the media host is known to publish synthetic media without having to analyze a specific media sample. This allows users of the virtual assistant 134 to quickly identify media sources that are known to disseminate synthetic media.

FIG. 3 illustrates how the media tool 104 in the example system from FIG. 1 may perform steps 204-214 of method 200. A string value 300 is determined from the quick response code 136 at step 204. The media tool 104 retrieves an authentication string value 302 from the authentication server 102 at step 206. The media tool 104 generates a media sample string value 304 at step 208. Quick response code string value 300 and media sample string value 304 are concatenated at step 210 to form string value 306. Likewise, authentication string value 302 and media sample string value 304 are concatenated at step 210 to form string value 308. The hashing engine 132 then applies a hash function 310 to string values 306 and 308 at step 212. In the example of FIG. 3, the hash function 310 is the MD5 function. String 306 yields hash value 312 and string 308 yields hash value 314 when the MD5 function is applied. While FIG. 3 illustrates step 212 with the MD5 function, any suitable hash function may be used. For example, the hash function 310 may be MD2, MD4, MD6, SHA-1, RIPEMD-160, RIPEMD-320, bcrypt, Whirlpool, Streebog, Tiger, SHA-2, SHA-3, KangarooTwelve, BLAKE, BLAKE2, or BLAKE3. One skilled in the art will appreciate that alternate algorithms may be used to achieve a similar result. Finally, at step 214 the media tool 104 compares the hash values 312 and 314 and determines that they do not match. Thus, a warning would be issued at step 218 that the media sample 138 is not authentic.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for authenticating media, comprising:
an authentication server comprising a first memory configured to store an authenticated media file associated with a first string value in a string value table, wherein the first string value is generated from one of a plurality of fragments from the authenticated media file;
a device comprising:
a second memory configured to store a hash function;
an optical scanner configured to scan a barcode from a media sample, wherein the barcode is associated with a second string value;
a hardware processor communicatively coupled to the optical scanner and the second memory, and configured to:
determine the second string value by decoding the barcode;
generate a third string value from a plurality of fragments from the media sample;
concatenate the first string value associated with one of the plurality of fragments from the authenticated media file with the second string value to generate a fourth string value;
concatenate the third string value with the second string value to generate a fifth string value;
apply the hash function to the fourth string value to generate a first hash value;
apply the hash function to the fifth string value to generate a second hash value;
determine that the first hash value and the second hash value match;
cause to be displayed an indication that the media sample is authentic.

2. The system of claim 1, wherein:
the authenticated media file is a video file; and
the authentication server further comprises a second hardware processor communicatively coupled to the first memory, configured to generate the first string value based on fragments of the video file that are predetermined as essential.

3. The system of claim 2, wherein the second hardware processor is further configured to generate the first string value based on the size of the video file.

4. The system of claim 1, wherein:
the barcode is further associated with a first media identifier;
the hardware processor is further configured to:
determine that the first media identifier matches a second media identifier associated with the authenticated media file; and
retrieve the first string value associated with the second media identifier from the first memory, wherein the first string value is linked to the second media identifier stored in the string value table stored in the first memory.

5. The system of claim 1, wherein:
the barcode is further associated with a first media identifier;
the authentication server further comprises a second hardware processor communicatively coupled to the first memory, configured to:
determine that the first media identifier matches a second media identifier associated with the authenticated media file; and
transmit the first string value to the device.

6. The system of claim 1, wherein the plurality of fragments from the media sample used to generate the third string value are selected using the same rules used to select fragments from the authenticated media file to generate the first string value.

7. The system of claim 1, wherein the plurality of samples from the authenticated media file comprises the authenticated media file's audio data and the plurality of fragments from the media sample comprises the media sample's audio data.

8. A method for authenticating media, comprising:
determining a first string value from a scanned barcode, the barcode associated with a media sample;
determining a second string value in a string value table from a first memory, wherein the second string value is generated from one of a plurality of fragments from an authenticated media file;
generating a third string value from a plurality of fragments from the media sample;
concatenating the first string value with the second string value associated with one of the plurality of fragments from the authenticated media file to generate a fourth string value;
concatenating the first string value with the third string value to generate a fifth string value;

applying a hash function to the fourth string value to generate a first hash value;
applying the hash function to the fifth string value to generate a second hash value;
determining that the first hash value and the second hash value match;
causing to be displayed an indication that the media sample is authentic.

9. The method of claim 8, wherein:
the authenticated media file is a video file; and
the plurality of fragments from the authenticated media file are selected based on a predetermination of which fragments are essential.

10. The method of claim 9, wherein the second string value is further generated based on the size of the video file.

11. The method of claim 8, wherein:
determining the second string value comprises matching a first media identifier associated with the scanned barcode with a second media identifier associated with the authenticated media file, wherein the second string value is linked to the second media identifier stored in the string value table stored in the first memory.

12. The method of claim 8, wherein the plurality of fragments from the media sample used to generate the third string value are selected using the same rules used to select fragments from the authenticated media file to generate the second string value.

13. The method of claim 8, wherein the plurality of fragments from the authenticated media file comprise the authenticated media file's audio data and the plurality of fragments from the media sample comprise the media sample's audio data.

14. The method of claim 8, wherein the barcode is a quick response code.

15. An apparatus for authenticating media, comprising:
a first memory configured to store a hash function;
an optical scanner configured to scan a barcode from a media sample, wherein the barcode is associated with a first string value;
a hardware processor communicatively coupled to the first memory and the optical scanner, and configured to:
determine the first string value from the scanned barcode;
determine a second string value in a string value table from a second memory, wherein the second string value is generated from one of a plurality of fragments from an authenticated media file;
generate a third string value from a plurality of fragments from the media sample;
concatenate the first string value with the second string value associated with one of the plurality of fragments from the authenticated media file to generate a fourth string value;
concatenate the first string value with the third string value to generate a fifth string value;
apply the hash function to the fourth string value to generate a first hash value;
apply the hash function to the fifth string value to generate a second hash value;
determine that the first hash value and the second hash value match;
cause to be displayed an indication that the media sample is authentic.

16. The apparatus of claim 15, wherein:
the authenticated media file is a video file; and
the plurality of fragments from the authenticated media file are selected based on a predetermination of which fragments are essential.

17. The apparatus of claim 16, wherein the second string value is further generated based on the size of the video file.

18. The apparatus of claim 15, wherein determine the second string value comprises matching a first media identifier associated with the scanned barcode with a second media identifier associated with the authenticated media file, wherein the second string value is linked to the second media identifier in the string value table stored in the second memory.

19. The apparatus of claim 15, wherein the plurality of fragments from the media sample used to generate the third string value are selected using the same rules used to select fragments from the authenticated media file to generate the first string value.

20. The apparatus of claim 15, wherein the plurality of fragments from the authenticated media file comprise the authenticated media file's audio data and the plurality of fragments from the media sample comprise the media sample's audio data.

* * * * *